3,044,854
PHOSPHORIC ACID

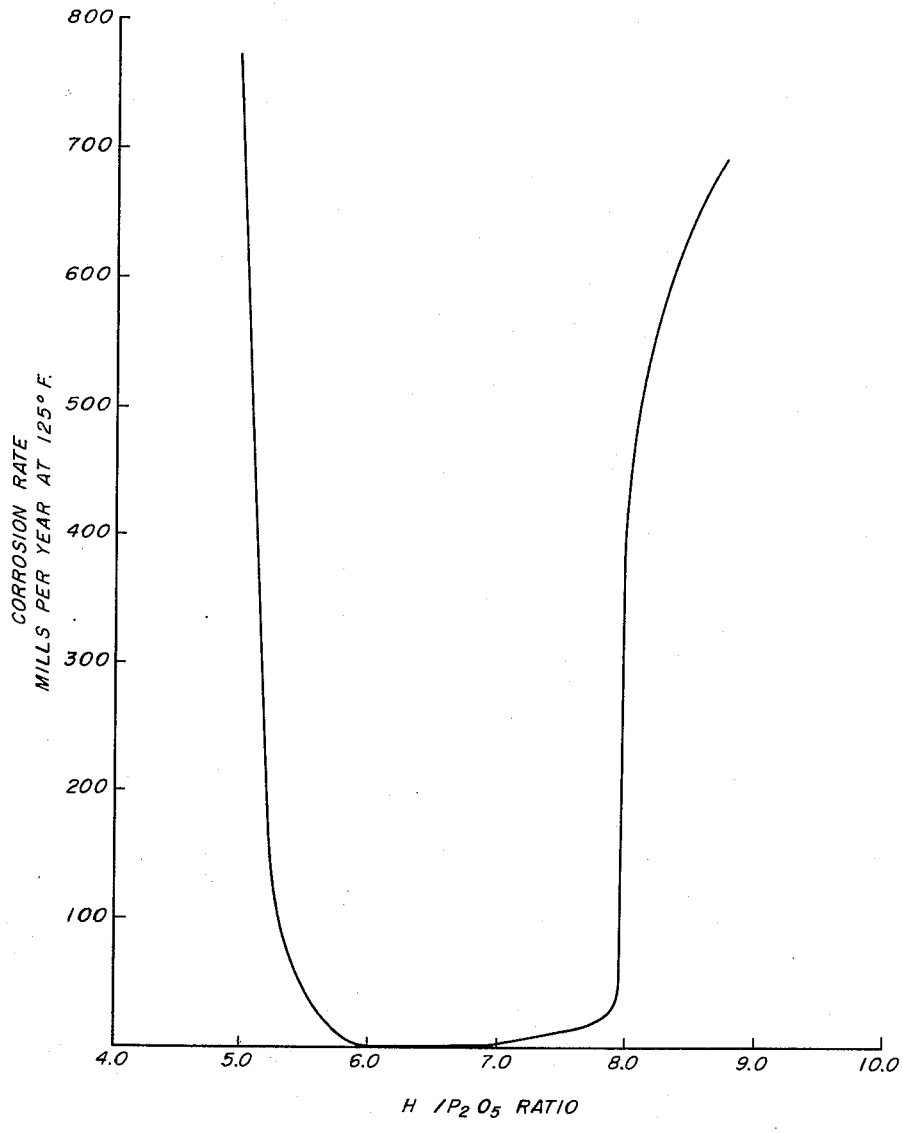

Donald C. Young, Fullerton, Calif., assignor, by mesne assignments, to Collier Carbon and Chemical Corporation, a corporation of California
Filed Jan. 11, 1960, Ser. No. 1,793
5 Claims. (Cl. 23—165)

This invention relates to the shipping, storing, handling and use of concentrated phosphoric acid, and in particular relates to a novel composition of phosphoric and sulfuric acids which has a low corrosivity, low viscosity and a low solidification temperature, and is useful in many varied applications, such as gas drying, metal pickling, fertilizer manufacture, etc.

The shipping, storing and handling of phospohric acid is troublesome because of its corrosivity and solidification characteristics. It has long been known that concentrated phospohric acid with a $P_2O_5$ content between about 67 and 74 weight percent is noncorrosive to mild steel. However, such an acid is a solid at ambient temperatures. For this reason, many manufacturers and users of phosphoric acid have preferred to handle the acid in the dilute form, even though this necessitates the shipping and storing of large quantities of water and use of expensive corrosion-resistant containers. One recommended type of storage tank for the dilute acid, for example, comprises a concrete shell lined with several layers of asphalt and tar paper, then lead and finally acid-proof masonry.

It is a purpose of this invention to obviate the need for these special corrosion precautions heretofore required and thereby permit handling of the acid in the liquid state at most ambient temperatures by providing a novel concentrated phosphoric acid composition having a low freezing point, low viscosity, and being substantially noncorrosive.

The composition of the invention which achieves this purpose comprises a mixture of phospohric and sulfuric acids having a phosphoric acid content expressed as $P_2O_5$ greater than about 62 weight percent and a sulfuric acid content between about 10 to 20 weight percent based on 100 percent strength sulfuric acid, said mixture also having a $H/P_2O_5$ ratio between about 5.4 and 7.9.

Sulfuric acid, when employed in the aforementioned concentration, depresses the freezing point of phosphoric acid to yield a final product having a freezing point less than about 30° F., thereby insuring that the mixture is a liquid at most ambient temperatures. Sulfuric acid has an additional and surprising effect on the viscosity of phosphoric acid, for it reduces the acid viscosity by 50 to 75 percent at the aforementioned concentrations. In addition to these highly beneficial effects, when the acid mixture is neutralized to form a fertilizer, the sulfate radical serves as a plant nutrient.

The composition can be obtained by any suitable method, depending on the source materials employed. For instance, a dilute phosphoric acid is processed in accordance with the invention by the addition of dilute, concentrated, or fuming sulfuric acid followed by concentration of the mixture through any suitable step, such as evaporation of water or by the addition of anhydrous phosphoric pentoxide. The mixture can also be obtained directly by the addition of the proper amount of fuming sulfuric acid or anhydrous sulfur trioxide to the dilute phosphoric acid. When a concentrated phosphoric acid containing greater than about 62 weight percent $P_2O_5$ is processed, it is preferred to add concentrated (98 percent strength) sulfuric acid so as to avoid dilution of the $P_2O_5$ content to less than 62 weight percent. Although fuming sulfuric acid or even sulfur trioxide can be added to concentrated phosphoric acid to obtain the proper weight percent of sulfuric acid in the mixture, this method is not preferred because a subsequent dilution step will then usually be necessary to obtain the necessary ratio of hydrogen to phosphoric pentoxide.

The drawing illustrates the relationship which has been found to exist between the ratio of hydrogen to $P_2O_5$ ($H/P_2O_5$) and corrosition of mild steel at 125° F. From this FIGURE, it is seen that the relationship is extremely critical, and that only acids having a $H/P_2O_5$ ratio between about 5.4 and 7.9 are noncorrosive. This same relationship pertains with respect to other ferrous metals and at other temperatures, i.e., phosphoric acids having this range of molal ratios of hydrogen to moles of phosphorus pentoxide will always be the least corrosive. While previous investigators have reported a noncorrosive range of phosphoric acid based on the phosphorus pentoxide or orthophosphoric acid contents, it has been found that such correlations are not satisfactory for a relatively impure acid, such as a concentrated wet-process acid, and in particular fail to correlate the corrosivity of mixtures of phosphoric acid with other strong mineral acids, such as hydrochloric or sulfuric. It is, therefore, necessary to specify the corrosivity of the acid mixture on basis of the ration of hydrogen to phosphorus pentoxide.

The test procedures to determine hydrogen and $P_2O_5$ content are briefly described as follows:

The amount of hydrogen in the acid composition is determined by placing a weighed portion of the acid in a crucible and covering it with a weighed portion of zinc oxide. The crucible is then dried at 100° C. for one hour, thereafter placed in a 550° C. furnace for an additional hour, cooled and weighed. The loss in weight corresponds to the amount of water in the acid and the amount formed by reaction of the zinc oxide with the acid, one-ninth thereof being the weight of hydrogen present in the original acid sample.

The $P_2O_5$ content of the acid sample is determined by diluting a representative acid sample with water and boiling it with a mixture of perchloric and nitric acids to completely hydrolyze all the acid to orthophosphoric acid. The sample is then diluted and passed through a cation exchange column to replace the metallic cations with hydrogen, and is thereafter neutralized by titration with sodium hydroxide. The difference in the titer value between the breaks in the titration curve, the first of which corresponds to the presence of other acids, e.g., sulfuric, hydrofluoric, etc., and the remaining break in the curve, is proportional to the amount of orthophosphoric acid present which is then reported as the pentoxide.

The following examples will serve to illustrate the invention:

EXAMPLE I

To demonstrate the use of the drawing for prediction of corrosion rates, four samples of concentrated phosphoric acid were analyzed for hydrogen and $P_2O_5$ content, and tested for corrosivity. The ratio of hydrogen to phosphorus pentoxide, the corrosion rates predicted from the drawing, observed corrosion rates are shown in the following table:

Table 1

| Sample | $P_2O_5$, Weight Percent | H, Weight Percent | $H/P_2O_5$ Ratio | Corrosion Rate, m.p.y. at 125° F. ||
|---|---|---|---|---|---|
| | | | | Drawing | Actual |
| 1 | 69.4 | 2.72 | 5.6 | 15 | Nil |
| 2 | 68.3 | 2.65 | 5.5 | 30 | 21 |
| 3 | 70.4 | 2.53 | 5.1 | 500 | 212 |
| 4 | 74.2 | 2.59 | 4.96 | 800 | 494 |

From the above example, it is apparent that the ratio of hydrogen to phosphorus pentoxide is a reliable means for determining whether any particular phosphoric acid is corrosive without lengthy corrosion testing.

EXAMPLE II

The three corrosive acid samples (2, 3 and 4) tested in Example I were diluted with sufficient water to reduce to $P_2O_5$ content. The following results were obtained:

*Table 2*

| Sample | $P_2O_5$, Weight Percent | H, Weight Percent | $H/P_2O_5$ Ratio | Corrosion Rate, m.p.y. at 125° F. | |
|---|---|---|---|---|---|
| | | | | Drawing | Actual |
| 2 (diluted) | 65.8 | 3.08 | 6.75 | Nil | Nil |
| 3 (diluted) | 65.5 | 3.12 | 6.76 | Nil | Nil |
| 4 (diluted) | 68.4 | 3.25 | 6.75 | Nil | Nil |

EXAMPLE III

The effect of sulfuric acid addition on concentrated phosphoric acid was investigated by the addition of 5, 10, 15, 20 and 25 percent by weight sulfuric acid calculated as 100 percent strength acid to five samples of phosphoric acid. The phosphoric acid was a concentrated "wet" process acid with laboratory analysis of 69 weight percent $P_2O_5$, a viscosity of 3,700 centipoises at 80° F., a negligible corrosion rate, and a freezing point greater than 70° F. The results of this test appear in the following Table 3:

*Table 3*

| Sample | Sulfuric Acid (Weight Percent) | Viscosity at 80° F. (centipoises) | Freezing point (° F.) | $H/P_2O_5$ Ratio | Corrosion Rate m.p.y at 125° F. | |
|---|---|---|---|---|---|---|
| | | | | | Drawing | Actual |
| Phosphoric acid | 0 | 3,700 | >70 | 6.75 | Nil | Nil |
| 1 | 5 | 1,670 | >30 | 5.87 | Nil | Nil |
| 2 | 10 | 700 | >30 | 5.52 | 30 | Nil |
| 3 | 15 | 440 | <30 | 5.19 | 130 | 11 |
| 4 | 20 | 420 | <30 | 4.82 | Extreme | 442 |
| 5 | 25 | 420 | <30 | 4.50 | Extreme | 949 |

From the example, it is apparent that sulfuric acid is a highly beneficial additive to phosphoric acid because of its dual effect in decreasing both the freezing point and the viscosity of the concentrated acid. The preferred range of sulfuric acid concentration in the final composition varies somewhat, e.g., between 12 and 20 weight percent, the upper limit being dependent upon the $P_2O_5$ and hydrogen content of the acid. Example III shows that for an acid having a $P_2O_5$ content of 69 weight percent, no greater than about 15 weight percent sulfuric acid should be added or the hydrogen to phosphorus pentoxide ratio will be outside the noncorrosive range. Greater amounts can be added to phosphoric acids having higher $P_2O_5$ contents, but in general the addition of greater than 20 weight percent sulfuric acid produces a corrosive final product. The lower range of sulfuric acid required is determined by the desired freezing point of the final product, a minimum of 10 percent usually required to reduce the freezing point to 40° F. or less, and generally a minimum of 12 to 15 percent preferred in all compositions to reduce the freezing point to 30° F. or less.

Having clearly, completely and concisely described my invention, I therefore claim:

1. A phosphoric acid composition characterized by a low freezing point and viscosity and being substantially noncorrosive to mild steel which comprises; phosphoric acid having a concentration corresponding to at least about 62 weight percent $P_2O_5$ and between about 10 and about 20 weight percent of sulfuric acid calculated as 100 percent strength acid, and having a $H/P_2O_5$ ratio between about 5.4 and about 7.9.

2. The method of reducing the freezing point of concentrated phosphoric acid having a concentration corresponding to at least about 62 weight percent $P_2O_5$ and having an $H/P_2O_5$ ratio between about 5.4 and about 7.9 which comprises adding sulfuric acid to said phosphoric acid in an amount sufficient to provide a composition having between about 10 and about 20 weight percent sulfuric acid calculated as 100 percent strength acid, sufficient to depress said freezing point but insufficient to produce a composition which is corrosive to ferrous metals.

3. The method of claim 2 wherein said sulfuric acid is added to a concentrated wet-process phosphoric acid having a $P_2O_5$ content between about 67 and 74 weight percent.

4. The composition of claim 1 wherein said phosphoric acid is a concentrated wet-process phosphoric acid having a $P_2O_5$ content between about 67 and 74 weight percent.

5. The composition of claim 1 wherein said composition contains between about 12 and about 15 weight percent of sulfuric acid, calculated as 100 percent strength acid.

References Cited in the file of this patent

UNITED STATES PATENTS

| 2,614,040 | Kaikinger | Oct. 14, 1952 |
| 2,653,177 | Kemp et al. | Sept. 22, 1953 |

OTHER REFERENCES

Chemical Engineering Hoover, The Corrosion Forum, December 1954, pages 230, 232 and 234.